US011606347B2

(12) United States Patent
Thubert et al.

(10) Patent No.: US 11,606,347 B2
(45) Date of Patent: Mar. 14, 2023

(54) DETERMINING SESSION DURATION FOR DEVICE AUTHENTICATION

(71) Applicant: Cisco Technology, Inc., San Jose, CA (US)

(72) Inventors: Pascal Thubert, Roquefort les Pins (FR); Patrick Wetterwald, Mouans Sartoux (FR); Jonas Zaddach, Antibes (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 17/004,368

(22) Filed: Aug. 27, 2020

(65) Prior Publication Data

US 2022/0070156 A1    Mar. 3, 2022

(51) Int. Cl.
*H04L 9/40* (2022.01)
*H04L 67/141* (2022.01)
*H04L 67/142* (2022.01)

(52) U.S. Cl.
CPC ............ *H04L 63/08* (2013.01); *H04L 63/123* (2013.01); *H04L 67/141* (2013.01); *H04L 67/142* (2013.01)

(58) Field of Classification Search
CPC ....... H04L 63/08; H04L 63/083; H04L 63/10; H04L 63/0853; H04L 63/108; H04L 63/105; H04L 63/107; H04L 67/306; G06F 21/31; G06F 21/44; G06F 21/32; G06F 2221/2111; G06F 16/958
See application file for complete search history.

(56) References Cited

U.S. PATENT DOCUMENTS

| 8,504,824 | B1* | 8/2013 | Abbott ............... H04L 63/0838 713/159 |
| 9,060,273 | B2 | 6/2015 | Brown et al. |
| 9,378,357 | B2 | 6/2016 | Abuelsaad et al. |
| 9,722,803 | B1 | 8/2017 | Ellingson et al. |
| 10,652,242 | B2 | 5/2020 | Dabbiere et al. |
| 2007/0071418 | A1* | 3/2007 | Kikkoji ................. H04L 65/611 386/326 |
| 2009/0133117 | A1 | 5/2009 | Bentley et al. |

(Continued)

OTHER PUBLICATIONS

The Search Report and Written Opinion for PCT Application No. PCT/US21/47137, dated Nov. 19, 2021, 30 Pages.

*Primary Examiner* — Michael A Keller
*Assistant Examiner* — Thao D Duong
(74) *Attorney, Agent, or Firm* — Lee & Hayes, P.C.

(57) ABSTRACT

This disclosure describes techniques for authenticating a user device for a session. For instance, an authentication entity may authenticate a user device using single sign-on authentication and/or multi-factor authentication. The authentication entity may then determine a duration for which the user device is authenticated for the session. For example, the authentication entity may receive information representing a state of an environment of the user device. The authentication entity may then use the information to identify one or more transitions associated with the environment between the session and a previous session. Using the one or more transitions, the authentication entity may determine the duration for the session by increasing or decreasing a previous duration associated with the previous session.

18 Claims, 8 Drawing Sheets

(56) References Cited

U.S. PATENT DOCUMENTS

| | | | |
|---|---|---|---|
| 2010/0057834 A1* | 3/2010 | Macken | G06F 9/543 |
| | | | 709/203 |
| 2012/0254957 A1* | 10/2012 | Fork | H04L 63/0807 |
| | | | 726/6 |
| 2013/0007845 A1* | 1/2013 | Chang | H04L 63/104 |
| | | | 726/4 |
| 2015/0176486 A1 | 6/2015 | Menheere et al. | |
| 2015/0227727 A1* | 8/2015 | Grigg | H04W 12/63 |
| | | | 726/4 |
| 2017/0250812 A1* | 8/2017 | Schefenacker | H04L 9/30 |
| 2019/0251544 A1 | 8/2019 | D'Agostino et al. | |
| 2020/0358755 A1* | 11/2020 | Abdul | H04L 67/146 |
| 2021/0120010 A1* | 4/2021 | Chen | H04L 67/146 |
| 2021/0126910 A1* | 4/2021 | Chauhan | H04L 63/0815 |
| 2021/0192027 A1* | 6/2021 | Malton | G06F 21/32 |
| 2021/0211422 A1* | 7/2021 | Shetty | G10L 17/00 |
| 2021/0306344 A1* | 9/2021 | Han | H04L 63/08 |
| 2022/0046014 A1* | 2/2022 | Wetterwald | H04L 63/0884 |

\* cited by examiner

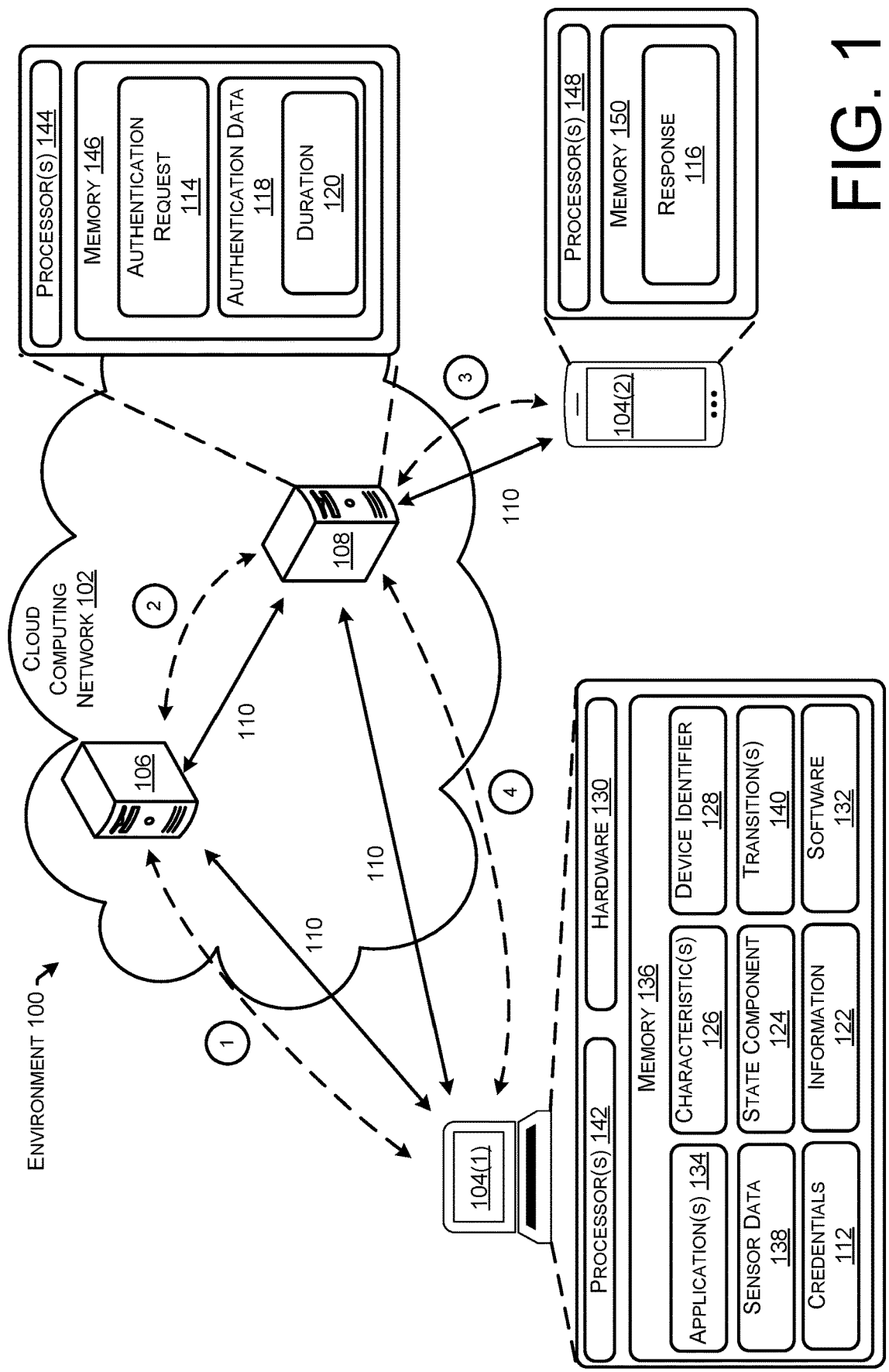

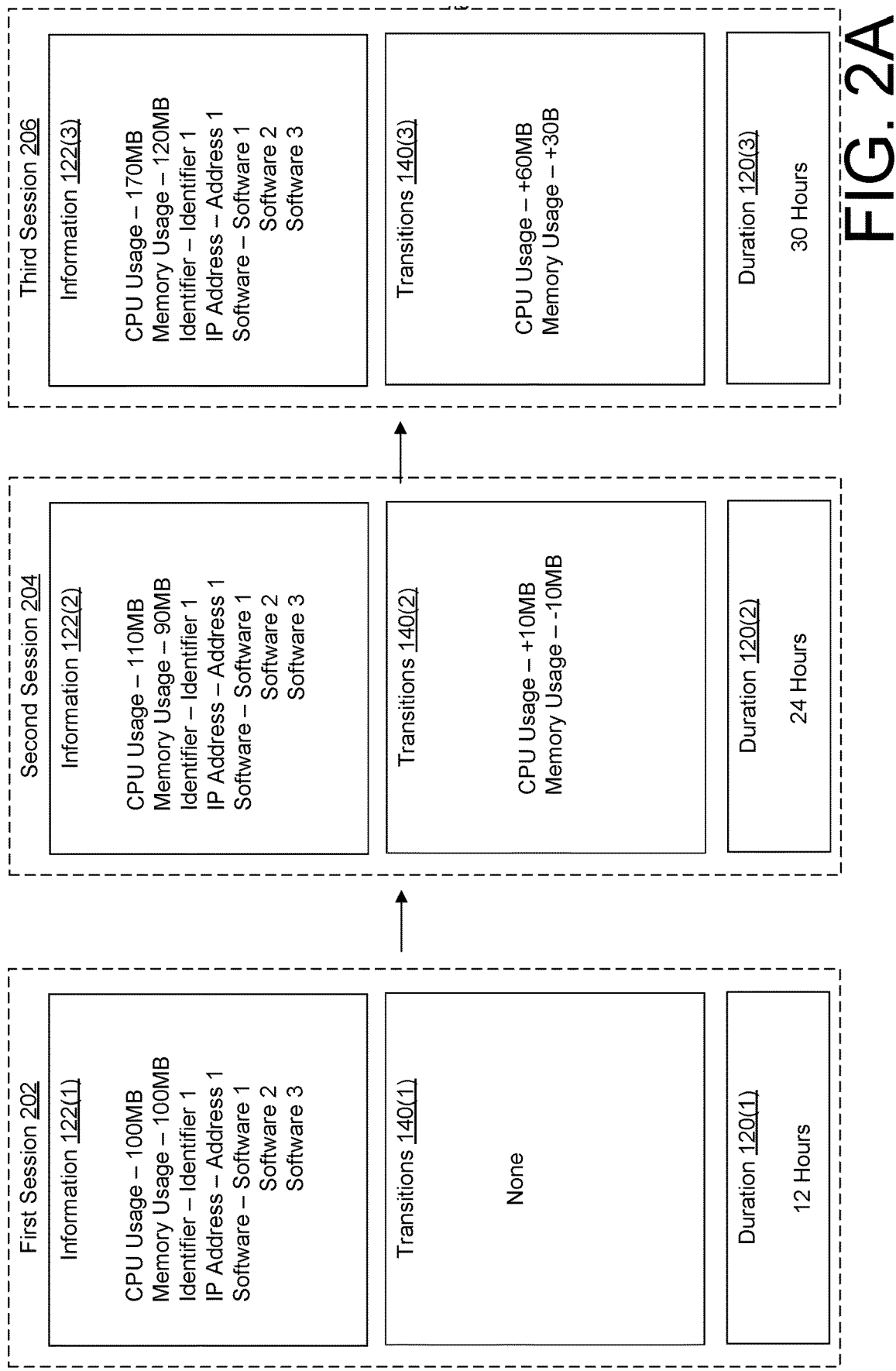

DETERMINING SESSION DURATION FOR DEVICE AUTHENTICATION

TECHNICAL FIELD

The present disclosure relates generally to an authentication entity for authenticating one or more devices of a user in association with cloud computing services.

BACKGROUND

Cloud computing offers businesses cost-effective access to virtually unlimited computing power and storage, rather than the businesses purchasing and/or maintaining physical computing resources. As such, many businesses offer services that are performed at distributed and/or remote locations. Since many services include use of private information of a user, such as personal and/or financial information, security is critical for many services offered via cloud computing. However, the distributed nature of cloud computing can increase the complexity of security issues. Therefore, the increasing use of cloud computing by businesses warrants improved methods for customer protection.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIG. 1 illustrates a component diagram with an example environment in which cloud authentication concepts may be employed, in accordance with the present concepts.

FIGS. 2A-2B illustrate an example of updating durations of sessions using information associated with an environment of a user device, in accordance with the present concepts.

DESCRIPTION OF EXAMPLE EMBODIMENTS

Overview

Figure 2B:
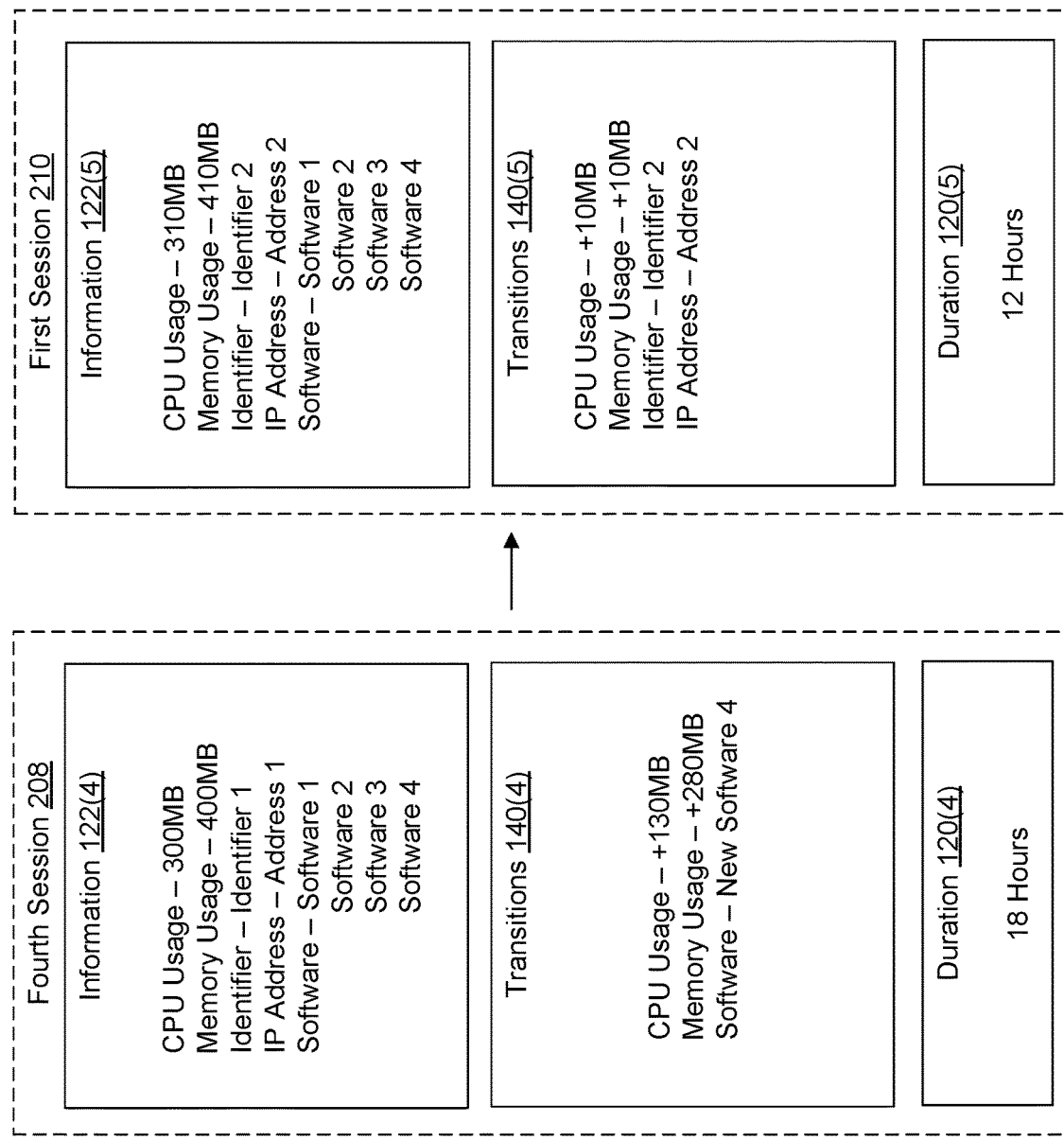

This disclosure describes, at least in part, one or more devices configured to determine a first duration associated with authenticating a user device during a first session. The one or more devices may then receive credentials associated with a user account and authenticate the user device for a second session based at least in part on the credentials. Based on authenticating the user device, the one or more devices may receive information associated with an environment of the user device and determine, based at least in part on the first duration and the information, a second duration associated with authenticating the user device during the second session. Additionally, the one or more devices may generate data representing at least the second duration and send the data to the user device.

This disclosure also describes, at least in part, a method that includes storing first information associated with an environment of a user device during a first session. The method may then include receiving credentials associated with a user account and authenticating the user device for a second session based at least in part on the credentials. Based at least in part on authenticating the user device, the method may include receiving second information associated with the environment of the user device for the second session and determining, based at least in part on the first information and the second information, a duration associated with authenticating the user device during the second session. Additionally, the method may include generating data representing at least the duration and sending the data to the user device.

This disclosure also describes, at least in part, a method that includes determining a first duration associated with authenticating a user device during a first session. The method may also include receiving credentials associated with a user account and authenticating the user device for a second session based at least in part on the credentials. Based on authenticating the user device, the method may include receiving information associated with an environment of the user device and determining, based at least in part on the first duration and the information, a second duration associated with authenticating the user device during the second session. Additionally, the method may include generating data representing at least the second duration and sending the data to the user device.

Example Embodiments

This disclosure describes, at least in part, techniques that may be implemented by an authentication entity that is coupled to one or more user devices and one or more online services. For instance, the authentication entity may provide an interface through which a user device of a user may be authenticated for access to the online service(s). The authentication entity may help the online service(s) trust the user device of the user to allow access to the online service(s) through the use of credentials associated with the user. For example, the authentication entity may provide the user with single sign-on (SOO) authentication, where the user device of the user is authenticated using at least the credentials. In some instances, the authentication entity may further use multi-factor authentication when authenticating the user device for the online service(s). Once the authentication entity authenticates the user device, the authentication entity may provide the user with data, such as a token, that the user device is able to use to access each of the online service(s) during a session. The session may be associated with a duration for which the token is valid for accessing the online service(s). Once the duration of the token expires, the authentication entity may require that the user device be re-authenticated using at least the credential (and/or the multi-factor authentication).

For more detail, the user may use the user device to attempt to log in to an online service. To log in to the online service, the user device may receive inputs representing the credentials (e.g., a username, a password, etc.) and send the credentials to the online service. The online service may then communicate with the authentication entity to determine if the user device can be trusted. In some instances, the authentication entity uses the credentials to authenticate the user device as a trusted device for the online service. For example, the authentication entity may match the credentials to additional credentials that are stored in association with a user account. Additionally, or alternatively, in some instances, the authentication entity performs multi-factor authentication to authenticate the user device as the trusted device for the online service. For example, the authentication entity may generate an authentication request and send the authentication request to the user (e.g., via email, a message, an application, etc.). The authentication request may include, but is not limited to, a code, a question, a password, a push notification, and/or any other factor that may be used to authenticate the user device. The authentication entity may then receive, from the user device and/or another device, a response to the authentication request and authenticate the user device using the response.

After authenticating the user device, the authentication entity may generate authentication data (e.g., a token, a cookie, etc.) that the user device can use to access the online service, as well as one or more other online services, during a session. The authentication data may include at least a duration for which the authentication data is valid to access the online service(s) during the session. After generating the authentication data, the authentication entity may send the authentication data to the user device. The user device is then able to use the authentication data to access the online service(s) during the session. For example, the user device may send the authentication data to the online service(s) during the session, where the online service(s) use the authentication data to trust the user device. After trusting the user device, the user device is able to use resources provided by the online service(s). However, at the expiration of the duration, the authentication data may no longer be valid to authenticate the user device and, as such, the authentication entity may require re-authentication of the user device.

The duration that the authentication data is valid may be important for one or more reasons. For a first example, if the duration is too short, the authentication entity may require that the user device be re-authenticated multiple times while the user is accessing the online service(s) during a period of time, such as during an hour, a day, a week, and/or the like. This may cause problems, such as being burdensome to the user as well as requiring computing resources to continuously authenticate the user device. For a second example, if the duration is too long, the authentication entity may not require that the user device be re-authenticated for an extended period of time. This may also cause problems, such as the authentication data being compromised during the session (e.g., retrieved by an unauthorized device during the session) and used to gain unauthorized access to the online service(s) of the user. As such, the authentication entity described herein may use one or more techniques in order to determine the duration of the session.

For instance, the authentication entity may use a set duration if this is the first time that the user device has been authenticated for a session. The set duration may include, but is not limited to, one hour, twelve hours, one day, one week, and/or any other period of time. The authentication entity may then update the duration each time the authentication entity authenticates the user device for a new session. In some instances, the authentication entity updates the duration by increasing or decreasing a previous duration for a previous session. Additionally, or alternatively, in some instances, the authentication entity updates the duration by once again using the set duration. In either of the instances, the authentication entity may use information associated with an environment of the user device when updating the durations for the user device.

For instance, a component (e.g., an application) executing on the user device may analyze the environment in order to determine one or more characteristics associated with a state of the environment. As described herein, the characteristic(s) may include, but are not limited to, a unique device identifier associated with the user device, hardware associated with the user device (e.g., hardware installed on the user device), software installed on the user device, one or more applications that are active on the user device, central processing unit (CPU) usage associated with the user device, memory usage associated with the user device, an Internet Protocol (IP) address associated with the user device, power consumption associated with the user device, a type of network connection associated with the user device, one or more other devices for which the user device is communicating (e.g., via Bluetooth, WiFi, etc.), sensor data representing a user of the user device, and/or the like. In some instances, the information sent to the authentication entity represents the characteristic(s). Additionally, or alternatively, in some instances, the information sent to the authentication entity represents one or more transitions associated with the environment.

For example, the component may compare the characteristic(s) associated with the environment to one or more previous characteristics associated with the environment. In some instances, the component determined the previous characteristic(s) during one or more previous sessions for which the user device was authenticated. Based on the comparison, the component may identify transition(s) between a current state of the environment and state(s) of the environment during the previous session(s) when the authentication entity authenticated the user device. As described herein, the transition(s) may include, but are not limited to, a change in the unique device identifier, a change in the hardware associated with the user device, a change in the software installed on the user device, a change in the one or more applications that are active on the user device, a change in the CPU usage associated with the user device, a change in the memory usage associated with the user device, a change in the IP address associated with the user device, a change in the power consumption associated with the user device (e.g., whether the user device was continuously receiving power or whether the user device stopped receiving power for period(s) of time), a change in the type of network connection associated with the user device, a change in the user of the user device (as determined using the sensor data), and/or any other state change.

In instances where the information represents the characteristic(s) associated with the environment, the authentication entity may perform similar processes as the component in order to identify the transition(s). For example, the authentication entity may store additional information representing the previous characteristic(s) associated with the environment. In some instances, the authentication entity stores the information each time the authentication entity receives such information from the user device and/or each time the authentication entity authenticates the user device. The authentication entity may then compare the characteristic(s) associated with the environment to the previous characteristic(s) in order to identify the transition(s) between the current state of the environment and the state(s) of the environment during the previous session(s) when the authentication entity authenticated the user device.

In either of the examples above, the authentication entity may use the transition(s) in order to determine the durations. For a first example, if the transition(s) indicate that the current state of the environment is similar to previous state(s) of the environment, then the authentication entity may determine the duration by increasing a previous duration associated with a previous session. In some instances, the greater the similarities between the current state of the environment and the previous state(s) of the environment, the greater the increase that the authentication entity uses when determining the duration. For a second example, if the transition(s) indicate that the current state of the environment is different than the previous state(s) of the environment, then the authentication entity may determine the duration by decreasing the previous duration associated with the previous session. In some instances, the greater the differences between the current state of the environment and the previous state(s) of the environment, the greater the decrease that the authentication entity uses when determining the duration.

In some instances, the authentication entity may determine that the transition(s) indicate that the current state of the environment is similar to the previous state(s) of the environment when there is little variance between the compared characteristic(s). For a first example, if the transition(s) only indicate a small change in the CPU usage (e.g., 1%, 5%, 10%, etc.) and/or a small change in the memory usage (e.g., 1%, 5%, 10%, etc.), then the authentication entity may determine that the current state of the environment is similar to the previous state(s) of the environment. For a second example, if the transition(s) only indicate that a new software application was activated on the user device, then the authentication entity may determine that the current state of the environment is still similar to the previous state(s) of the environment. However, the authentication entity may determine that the similarity in the first example is greater than the similarity in the second example and, as such, the authentication entity may increase the duration by a greater amount in the first example than in the second example.

In some instances, the authentication entity may determine that the transition(s) indicate that the current state of the environment is different to the previous state(s) of the environment when there is a large variance between the compared characteristic(s). For a first example, if the transition(s) indicate a large change in the CPU usage (e.g., 75%, 80%, 90%, etc.) and/or a large change in the memory usage (e.g., 75%, 80%, 90%, etc.), then the authentication entity may determine that the current state of the environment is different from the previous state(s) of the environment. For a second example, if the transition(s) indicate that the user device is using a new IP address and/or has a new unique device identifier, then the authentication entity may again determine that the current state of the environment is different from the previous state(s) of the environment. However, the authentication entity may determine that the difference in the second example is greater than the difference in the first example and, as such, the authentication entity may decrease the duration by a greater amount in the second example than in the first example.

In some instances, the authentication entity may analyze the information in order to identify "triggering events" associated with the environment of the user device. As described herein, a triggering event may include, but is not limited to, a change in the user of the user device (determined using image data, biometric data, etc.), malicious hardware/software identified on the user device (e.g., malware), a change in the unique device identifier, a change in the IP address, an unsecured network connection (e.g., the user device connected to a public and unsecured network, and/or the like. In some instances, when the authentication entity identifies a triggering event, the authentication entity may require that the user device be re-authenticated (either using the credentials and/or by performing multi-factor authentication). Additionally, or alternatively, in some instances, when the authentication entity identifies the triggering event, the authentication entity may determine the duration as the set duration and/or determine the duration by decreasing the previous duration.

In the examples above, and in some instances, the authentication entity may receive the information from the user device each time the authentication entity authenticates the user device for the online service(s). Additionally, or alternatively, in some instances, the authentication entity may receive the information at various times. For example, the authentication entity may receive the information at given time intervals during a session, continuously during a session, each time there is a period of inactivity between the user device and the online service(s), and/or at any other time. Additionally, or alternatively, in some instances, the authentication entity may receive the information based on sending, to the user device, a request for the information.

For example, after authenticating the user device for a session, the authentication entity may determine a duration (e.g., 24 hours) associated with the session. However, during the session (e.g., 12 hours into the session), the authentication entity may again perform an authentication of the user device (e.g., using the processes described herein). Based on that authentication, the authentication entity may determine whether to update the duration, such as to decrease the duration (e.g., to 18 hours) or increase the duration (e.g., to 48 hours) from the time of the original authentication. As such, the authentication may use the new duration when determining when to once again reauthenticate the user device. For example, if the authentication entity decreases the duration, then authentication entity may determine to reauthenticate the user device after 18 hours elapses from the original authentication. Additionally, if the authentication entity increases the duration, then authentication entity may determine to reauthenticate the user device after 24 hours elapses from the original authentication.

For another example, the authentication entity may again authenticate the user device for a first session that includes a first duration (e.g., 24 hours). However, at a time during the first session (e.g., 12 hours into the first session), the authentication entity may determine a second duration for a second session. If the second duration (e.g., 10 hours) is less than the time into the first session (e.g., 12 hours into the first session), then the authentication entity may determine to reauthenticate the user device immediately. However, if the second duration (e.g., 48 hours) is greater than the time into the first duration (e.g., 12 hours into the first session), then the authentication entity may determine not to reauthenticate the user device for the second duration (e.g., 48 hours after the start of the first duration).

Additionally, in the examples above, the component executing on the user device and/or the authentication entity may use one or more machine learned models to identify the transition(s) associated with the current state of the environment. For example, the machine learned model(s) may be configured to analyze characteristic(s) associated with the environment of the user device, such as each time the component determines the characteristic(s). Based on the analysis, the machine learned model(s) identify (e.g., learn) characteristic(s) that remain substantially constant. For example, the machine learned model(s) may identify that the user device usually uses the same IP address, usually uses the same unique device identifier, includes a CPU usage that falls within a given range, includes application(s) that are usually active on the user device, and/or the like. The component and/or the authentication entity may then compare new characteristic(s) to the learned characteristic(s) in order to identify the transition(s). When using machine learned model(s) to identify the transition(s), the transition(s) may correspond to "anomalies" with the user device. The authentication entity may thus use these anomalies when determining the durations.

For example, if the authentication entity determines that the anomalies are minor, then the authentication entity may determine a duration by increasing a previous duration associated with the user device. In some instances, the authentication entity may determine that the anomalies are minor using similar processes as described above with respect to the state changes. For instance, the authentication entity may determine that the anomalies are minor based on the anomalies indicating that the current state of the environment is similar to the previous state(s) of the environment. For another example, if the authentication entity determines that the anomalies are major, then the authentication entity may determine a duration by decreasing a previous duration associated with the user device. In some instances, the authentication entity may determine that the anomalies are major using similar processes as described above with respect to the state changes. For instance, the authentication entity may determine that the anomalies are major based on the anomalies indicating that the current state of the environment is different than the previous state(s) of the environment.

Although the examples described herein may refer to a user device and/or an authentication entity as participating in a multi-party cloud authentication system in a cloud networking environment, the techniques can generally be applied to any device or role, including an enterprise workforce scenario. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The user devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present cloud authentication concepts. The example environment 100 may include a cloud computing network 102 (e.g., network), one or more user devices 104, one or more server devices 106, and/or one or more authentication devices 108 (e.g., an authentication entity). Parentheticals are utilized after a reference number to distinguish like elements. Use of the reference number without the associated parenthetical is generic to the element. For example, FIG. 1 includes two instances of a user device 104, including the user device 104(1), which may represent a desktop computer, and the user device 104(2), which may represent a mobile phone. In some scenarios, multiple user devices 104 may be associated with a single user. The server device(s) 106 may provide a remote, online service that the user wishes to engage via at least the user device 104(1). Additionally, the authentication device(s) 108 may perform authentication entity function(s) to authenticate the user device 104(21) for the server device(s) 106.

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

The user device(s) 104, server device(s) 106, and/or authentication device(s) 108 may be communicatively coupled among one another and/or to various other devices via cloud computing network 102. Within the example environment 100, a user device 104, a server device 106, an authentication device 108, and/or other devices may exchange communications (e.g., packets) via a network connection(s) to cloud computing network 102, indicated by double arrows 110. For instance, network connections 110 may be transport control protocol (TCP) network connections or any network connection (e.g., information-centric networking (ICN)) that enable the devices to exchange packets with other devices via cloud computing network 102. The network connections 110 represent, for example, a data path between a user device 104 and the authentication device(s) 108. For example, the user device 104 may be a computer, laptop, mobile device, tablet, etc., while the server device(s) 106 and/or the authentication device(s) 108 may be configured to provide data and/or network services to the user device 104. The server device(s) 106 and/or authentication device(s) 108 may or may not be a producer, a point of generation and/or origination of the data. For instance, the data may originate elsewhere for the server device(s) 106 and/or the authentication device(s) 108 to be able to provide to the user device 104. Additionally, or alternatively, the data may pass through other network devices (e.g., router, switch) on a path from the server device(s) 106 and/or the authentication device(s) 108 to the user device 104. It should be appreciated that the term "network connection" may also be referred to as a "network path." The use of a cloud computing network in this example is not meant to be limiting. Other types of networks are contemplated in accordance with multi-party cloud authentication concepts.

At "Step 1," the user device 104(1) may communicate with the server device(s) 106. The communication at Step 1 may include the user device 104(1) attempting to log in to an account (e.g., email account, messaging account, ect.) associated with the server device(s) 106. For instance, the user device 104(1) may receive input(s) representing credentials 112 associated with the account. The credentials 112 may include, but are not limited to, a username and password associated with the account. The user device 104(1) may then send the credentials 112 to the server device(s) 106. In some instances, based on receiving the credentials 112, the server device(s) 106 may authenticate the user device 104(1). For example, the server device(s) 106 may match the credentials 112 to additional credentials stored in association with the account. Additionally, or alternatively, in some instances, the server device(s) 106 may determine to use the authentication device(s) 108 to authenticate the user device 104(1) as a trusted device.

For example, at "Step 2," the server device(s) 106 may communicate with the authentication device(s) 108. The communication at Step 2 may include the server device(s) 106 sending, to the authentication device(s) 108, the credentials 112 and/or other data that identifies the user device 104(1). In some instances, the authentication device(s) 108 may use the credentials 112 to authenticate the user device 104(1), similar to the server device(s) 106 described above. Additionally, or alternatively, in some instances, the authentication device(s) 108 may determine to use multi-factor authentication in order to authenticate the user device 104(1). In such instances, although not illustrated in the example of FIG. 1, the authentication device(s) 108 may communicate with the user device 104(1) in order to select how the authentication device(s) 108 are to provide an authentication request 114 associated with the multi-factor authentication. For example, the authentication device(s) 108 may allow the user to select either email, text message, push notification, and/or the like for sending the authentication request 114.

At "Step 3," the authentication device(s) 108 may communicate with the user device 104(2). The communication at Step 3 may include providing the user device 104(2) with the authentication request 114 via the selected type of communication. The user device 104(2) may then receive input(s) representing a response 116 to the authentication request 114. For a first example, if the authentication request 114 includes a code that is emailed to the user, then the response 116 may include the emailed code. For a second example, if the authentication request 114 includes a question for the user, then the response 116 may include the answer to the question. Still, for a third example, if the authentication request 114 includes a push notification, then the response 116 may include the user selecting an interface element, such as a button, associated with the push notification. In either of the examples, the user device 104(2) may then send the response 116 back to the authentication device(s) 108.

The authentication device(s) 108 may then use the response 116 to authenticate the user device 104(1) via the multi-factor authentication. For example, the authentication device(s) 108 may determine that the response 116 to the authentication request 114 is correct. The authentication device(s) 108 may then generate authentication data 118, such as a token, a cookie, and/or the like, that the user device 104(1) may use to access the one or more services provided by the server device(s) 106. As shown in the example of FIG. 1, the authentication data 118 includes at least a duration 120 for which the authentication data 118 is valid. For example, during the duration 120 of the authentication data 118, the user device 104(1) may use the authentication data 118 to access the resources provided by the server device(s) 106. For instance, the server device(s) 106 may receive the authentication data 118 from the user device 104(1) and use the authentication data 118 to determine that the user device 104(1) is trusted. However, at the expiration of the duration 120, the user device 104(1) may no longer be able to access the resources provided by the server device(s) 106 using the authentication data 118. Rather, the user device 104(1) may be required to re-authenticate with the authentication device(s) 108.

To determine the duration, and at "Step 4," the authentication device(s) 108 may communicate with the user device 104(1). The communication at Step 4 may include the authentication device(s) 108 requesting information 122 from the user device 104(1) that the authentication device(s) 108 use to determine the duration 120. Based on the request, a state component 124 (e.g., an application executing on the user device 104(1)) may analyze the environment in order to determine one or more characteristics 126 associated with a state of the environment. As described herein, the characteristic(s) 126 may include, but are not limited to, a unique device identifier 128 associated with the user device 104(1), hardware 130 associated with the user device 104(1) (e.g., hardware 130 installed on the user device 104(1)), software 132 installed on the user device 104(1), one or more applications 134 that are active on the user device 104(1), central processing unit (CPU) usage associated with the user device 104(1), memory 136 usage associated with the user device 104(1), an IP address associated with the user device 104(1), power consumption associated with the user device 104(1), a type of network connection associated with the user device 104(1), one or more other devices for which the user device 104(1) is communicating (e.g., via Bluetooth, WiFi, etc.), sensor data 138 representing a user of the user device 104(1), and/or the like. In some instances, the information 122 may represent the characteristic(s) 126 associated with the environment.

Additionally, or alternatively, in some instances, the state component 124 may compare the characteristic(s) 126 associated with the current state of the environment to one or more previous characteristics 126 associated with one or more previous states of the environment. In some instances, the state component 124 determined the previous characteristic(s) during one or more previous sessions for which the user device 104(1) was authenticated. Based on the comparison, the state component 124 may identify one or more transitions 140 between the current state of the environment and the state(s) of the environment during previous session(s) when the authentication device(s) 108 authenticated the user device 104(1), which are described above. In such instances, the information 122 may represent the transition(s) 140.

In instances where the information 122 represents the characteristic(s) 126 associated with the environment, the authentication device(s) 108 may perform similar processes as the state component 124 in order to identify the transition(s) 140. For example, the authentication device(s) 108 may store additional information 122 representing the previous characteristic(s) 126 associated with the environment. In some instances, the authentication device(s) 108 store the information 122 each time the authentication device(s) 108 receive such information 122 from the user device 104(1) and/or each time the authentication device(s) 108 authenticate the user device 104(1). The authentication device(s) 108 may then compare the characteristic(s) 126 associated with the current state of the environment, as represented by the received information 122, to the previous characteristic(s) 126 associated with the previous state(s) of the environment, as represented by previous information 122, in order to identify the transition(s) 140 between the current state of the environment and the previous state(s) of the environment.

The authentication device(s) 108 may then use the transition(s) 140 to determine the duration 120. For example, the authentication device(s) 108 may use a set duration 120 if this is the first time that the user device 104(1) has been authenticated for a session. As described above, the set duration 120 may include, but is not limited to, one hour, twelve hours, one day, one week, and/or any other period of time. The authentication device(s) 108 may then update the duration 120 each time the authentication device(s) 108 authenticate the user device 104(1) for a new session. In some instances, the authentication device(s) 108 updates the duration 120 by increasing or decreasing a previous duration 120 for a previous session.

For example, if the transition(s) 140 indicate that the current state of the environment is similar to the previous state(s) of the environment, then the authentication device(s) 108 may determine the duration 120 by increasing a previous duration 120 associated with a previous session. In some instances, the greater the similarities between the current state of the environment and the previous state(s) of the environment, the greater the increase that the authentication device(s) 108 use when determining the duration 120. For another example, if the transition(s) 140 indicate that the current state of the environment is different than the previous state(s) of the environment, then the authentication device(s) 108 may determine the duration 120 by decreasing the previous duration 120 associated with the previous session. In some instances, the greater the differences between the current state of the environment and the previous state(s) of the environment, the greater the decrease that the authentication device(s) 108 use when determining the duration 120.

In some instances, the authentication device(s) 108 may analyze the information 122 and/or the transition(s) 140 in order to identify "triggering events" associated with the environment of the user device 104(1). As described herein, a triggering event may include, but is not limited to, a change in the user of the user device (determined using image data, biometric data, etc.), malicious hardware/software identified on the user device (e.g., malware), a change in the unique device identifier, a change in the IP address, and/or the like. In some instances, when the authentication device(s) 108 identify a triggering event, the authentication device(s) 108 may require that the user device 104(1) be re-authenticated (either using the credentials and/or by performing multi-factor authentication). Additionally, or alternatively, in some instances, when the authentication device(s) 108 identify the triggering event, the authentication device(s) 108 may determine the duration 120 as the set duration 120 and/or determine the duration 120 by decreasing the previous duration 120.

Additionally, in the examples above, the state component 124 and/or the authentication device(s) 108 may use one or more machine learned models to identify the transition(s) 140 associated with the current state of the environment. For example, the machine learned model(s) may be configured to analyze characteristic(s) 126 associated with the environment of the user device 104(1), such as each time the state component 104(1) determines the characteristic(s) 126. Based on the analysis, the machine learned model(s) identify (e.g., learn) characteristic(s) 140 that remain substantially constant. For example, the machine learned model(s) may identify that the user device 104(1) usually uses the same IP address, usually uses the same unique device identifier, includes a CPU usage that falls within a given range, includes application(s) that are usually active on the user device 10(1), and/or the like. The state component 124 and/or the authentication device(s) 108 may then compare new characteristic(s) 126 to the learned characteristic(s) 126 in order to identity the transition(s) 140.

In the example of FIG. 1, and in some instances, after generating the authentication data 118, the authentication device(s) 108 may send the authentication data 118 to the user device 104(1). Additionally, or alternatively, in some instances, after generating the authentication data 118, the authentication device(s) 108 may send the authentication data 118 to the server device(s) 106, which may then send the authentication data 118 to the user device 104(1). In either of the instances, the user device 104(1) may then use the authentication data 118 to access services provided by the server device(s) 106 during the duration 120.

As further illustrated in the example of FIG. 1, the user device 104(1) includes processor(s) 142 and the memory 136, the authentication device(s) 108 include processor(s) 144 and memory 146, and the user device 104(2) includes processor(s) 148 and memory 150. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

FIGS. 2A-2B illustrate an example of updating durations of sessions using information associated with an environment of the user device 104(1), in accordance with the present concepts. For example, and for a first session 202, the authentication device(s) 108 may receive first information 122(1) from the user device 104(1). As shown, the first information 122(1) indicates that a first state of the environment includes a CPU usage of 100 MB, a memory usage of 100 MB, a unique device identifier of Identifier 1, an IP address of Address 1, and three active software applications (e.g., Software 1-3). In the example of FIGS. 2A-2B, the first session 202 may correspond to the first time that the authentication device(s) 108 have authenticated the device 104(1) for a session. As such, the authentication device(s) 108 may determine that there are no first transition(s) 140(1) associated with the environment. As such, the authentication device(s) 108 may determine to use a set duration as a first duration 120(1) for the first session 202 which, in the example of FIGS. 2A-2B, includes 12 hours.

At a second session 204, the authentication device(s) 108 may receive second information 122(2) from the user device 104(1). As shown, the second information 122(2) indicates that a second state of the environment includes a CPU usage of 110 MB, a memory usage of 90 MB, a unique device identifier of Identifier 1, an IP address of Address 1, and three active software applications (e.g., Software 1-3). As such, the authentication device(s) 108 may compare the second information 122(2) to the first information 122(1) in order to identify second transitions 140(2). The second transitions 140(2) may include a CPU usage increase of 10 MB and a memory usage decrease of 10 MB. As such, the authentication device(s) 108 may determine that the second state of the environment is similar to the first state of the environment. Therefore, the authentication device(s) 108 may determine a second duration 120(2) by increasing the first duration 120(1). As shown in the example of FIGS. 2A-2B, the second duration 120(2) includes 24 hours.

At a third session 206, the authentication device(s) 108 may receive third information 122(3) from the user device 104(1). As shown, the third information 122(3) indicates that a third state of the environment includes a CPU usage of 170 MB, a memory usage of 120 MB, a unique device identifier of Identifier 1, an IP address of Address 1, and three active software applications (e.g., Software 1-3). As such, the authentication device(s) 108 may compare the third information 122(3) to the second information 122(2) in order to identify third transitions 140(3). The third transitions 140(3) may include a CPU usage increase of 60 MB and a memory usage increase of 120 MB. As such, the authentication device(s) 108 may determine that the third state of the environment is similar to the second state of the environment. Therefore, the authentication device(s) 108 may determine a third duration 120(3) by increasing the second duration 120(2). However, since the third state of the environment is less similar to the second state of the environment than the second state of the environment was to the first state of the environment, the authentication device(s) 108 may determine to increase the third duration 120(3) by a smaller amount. As shown in the example of FIGS. 2A-2B, the third duration 120(3) includes 30 hours.

At a fourth session 208, the authentication device(s) 108 may receive fourth information 122(4) from the user device 104(1). As shown, the fourth information 122(4) indicates that a fourth state of the environment includes a CPU usage of 300 MB, a memory usage of 400 MB, a unique device identifier of Identifier 1, an IP address of Address 1, and four active software applications (e.g., Software 1-4). As such, the authentication device(s) 108 may compare the fourth information 122(4) to the third information 122(3) in order to identify fourth transitions 140(4). The fourth transitions 140(4) may include a CPU usage increase of 130 MB, a memory usage increase of 280 MB, and new activate software (e.g., Software 4). As such, the authentication device(s) 108 may determine that the fourth state of the environment is different than the third state of the environment. Therefore, the authentication device(s) 108 may determine a fourth duration 120(4) by decreasing the third duration 120(3). As shown in the example of FIGS. 2A-2B, the fourth duration 120(4) includes 18 hours.

Finally, at a fifth session 210, the authentication device(s) 108 may receive fifth information 122(5) from the user device 104(1). As shown, the fifth information 122(5) indicates that a fifth state of the environment includes a CPU usage of 310 MB, a memory usage of 410 MB, a unique device identifier of Identifier 2, an IP address of Address 2, and four active software applications (e.g., Software 1-4). As such, the authentication device(s) 108 may compare the fifth information 122(5) to the fourth information 122(4) in order to identify fifth transitions 140(5). The fifth transitions 140(5) may include a CPU usage increase of 10 MB, a memory usage increase of 10 MB, a new unique device identifier (e.g., Identifier 2), and a new IP address (e.g., IP address 2). As such, the authentication device(s) 108 may determine that a triggering event has occurred and determine to once again use the set duration 120 for the fifth session 210. As shown in the example of FIGS. 2A-2B, the fifth duration 120(5) includes 12 hours.

It should be noted that while the example of FIGS. 2A-2B describes the authentication device(s) 108 as receiving the information 122 and using the information 122 to determine the transitions 140, in other examples, the state component 124 of the user device 104(1) may initially use the information 122 to determine the transitions 140. In such examples, the information 122 that the user device 104(1) sends to the authentication device(s) 108 may represent the transitions 140.

Figure 3:
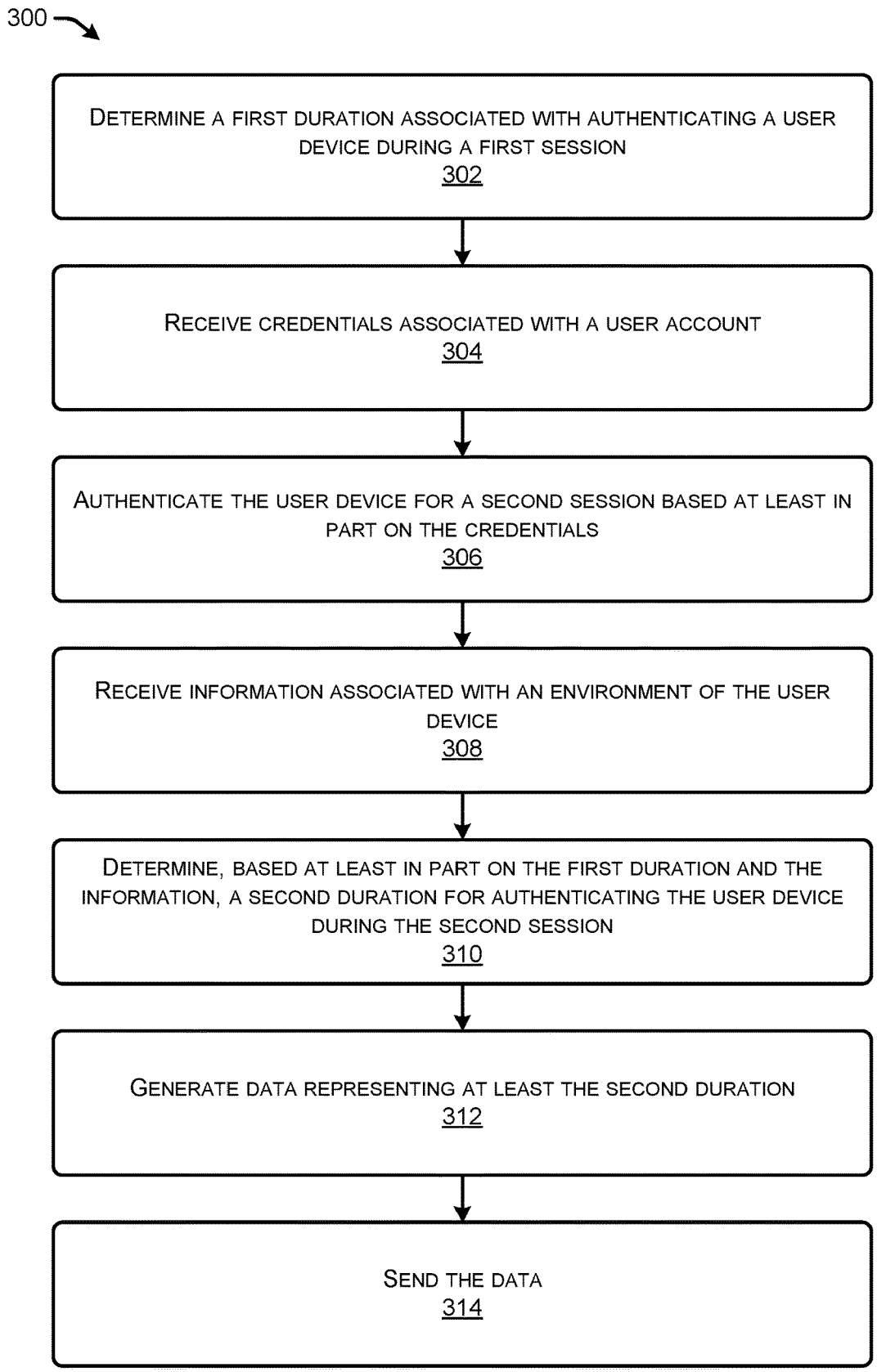
FIG. 3 illustrates a flow diagram of a first example method for determining a duration associated with authenticating a user device during a session.

FIG. 3 illustrates a flow diagram of a first example method 300 for determining a duration associated with authenticating a user device during a session. An operation 302 represents determining a first duration associated with authenticating a user device during a first session. For instance, authentication device(s) 108 may determine the first duration for the user device. In some instances, the authentication device(s) 108 may determine the first duration as a set duration that the authentication device(s) 108 initially use when new devices are authenticated. In some instances, the authentication device(s) 108 determine the first duration using information representing an environment of the user device. For instance, the authentication device(s) 108 may use the information to determine the first duration by increasing or decreasing a previous duration associated with a previous session.

An operation 304 represents receiving credentials associated with a user account and an operation 306 represents authenticating the user device for a second session based at least in part on the credentials. For instance, the authentication device(s) 108 may use the credentials to authenticate the user device for the second session. In some instances, the authentication device(s) 108 may provide the user device with single sign-on authentication. Additionally, in some instances, the authentication device(s) 108 may perform a multi-factor authentication in order to authenticate the user device.

An operation 308 represents receiving information associated with an environment of the user device. For instance, the authentication device(s) 108 may receive the information from the user device. In some instances, the information may represent one or more characteristics associated with the current state of the environment of the user device. Additionally, or alternatively, in some instances, the information may represent one or more transitions between the current state of the environment and one or more previous states associated with the environment.

An operation 310 represents determining, based at least in part on the first duration and the information, a second duration for authenticating the user device during the second session. For instance, the authentication device(s) 108 may use the information and the first duration in order to determine the second duration. In some instances, the authentication device(s) 108 initially identify one or more transition(s) between the current state of the environment and the previous state(s) of the environment. The authentication device(s) 108 then use the transition(s) to determine the second duration. For instance, if the transition(s) indicate that the current state of the environment is similar to the previous state(s) of the environment, then the authentication device(s) 108 may determine the second duration by increasing the first duration. Alternatively, if the transition(s) indicate that the current state of the environment is different than the previous state(s) of the environment, then the authentication device(s) 108 may determine the second duration by decreasing the first duration.

An operation 312 represents generating data representing at least the second duration and an operation 314 represents sending the data. For instance, the authentication device(s) 108 may generate the data (e.g., a token, a cookie, etc.) that represents at least the second duration. In some instances, the authentication device(s) 108 then send the data to the user device. Additionally, or alternatively, in some instances, the authentication device(s) 108 send the data to one or more service devices. In either of the instances, the user device uses the data to gain access to services provided by the service device(s). For instance, the service device(s) may use the data to determine that the user device includes a trusted device during the second duration.

Figure 4:
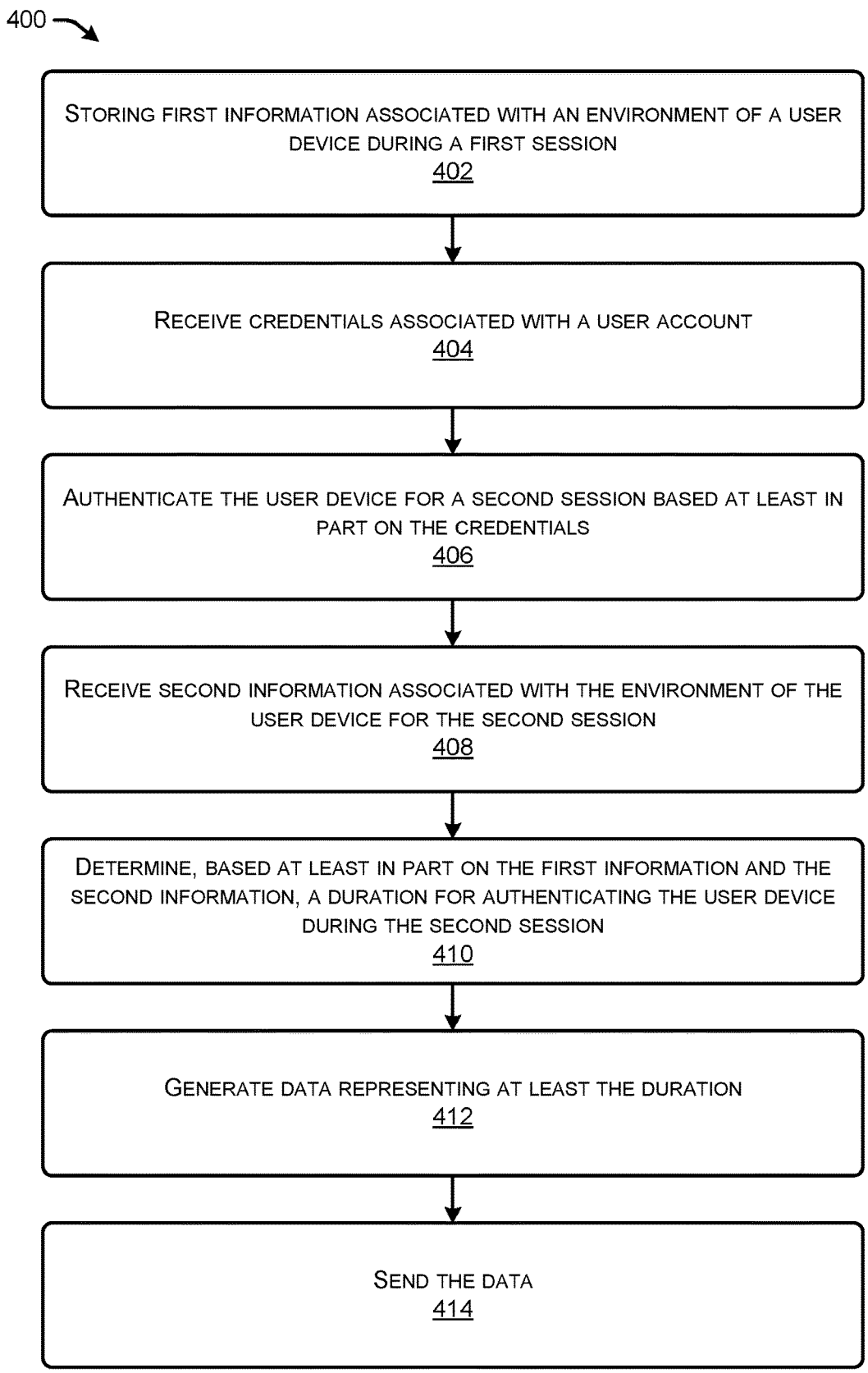
FIG. 4 illustrates a flow diagram of a second example method for determining a duration associated with authenticating a user device during a session.

FIG. 4 illustrates a flow diagram of a second example method 400 for determining a duration associated with authenticating a user device during a session. An operation 402 represents storing first information associated with an environment of a user device during a first session. For instance, the authentication device(s) 108 may have previously authenticated the user device for the first session. During and/or after authenticating the user device, the authentication device(s) 108 may have received the first information associated with the state of the environment of the user device during the first session. The authentication device(s) 108 may have then used the first information to determine a duration for the first session. Also, the authentication device(s) 108 may have stored the first information for later determining durations for later sessions associated with the user device.

An operation 404 represents receiving credentials associated with a user account and an operation 406 represents authenticating the user device for a second session based at least in part on the credentials. For instance, the authentication device(s) 108 may use the credentials to authenticate the user device for the second session. In some instances, the authentication device(s) 108 may provide the user device with single sign-on authentication. Additionally, in some instances, the authentication device(s) 108 may perform a multi-factor authentication in order to authenticate the user device.

An operation 408 represents receiving second information associated with the environment of the user device. For instance, the authentication device(s) 108 may receive the information from the user device for the second session. In some instances, the second information may represent one or more characteristics associated with the current state of the environment of the user device.

An operation 410 represents determining, based at least in part on the first information and the second information, a duration for authenticating the user device during the second session. For instance, the authentication device(s) 108 may use at least the first information and the second information in order to determine the duration. In some instances, the authentication device(s) 108 initially identify one or more transitions between the current state of the environment, as represented by the second information, and a previous state of the environment, as represented by the first information. The authentication device(s) 108 then use the transition(s) to determine the duration. For instance, if the transition(s) indicate that the current state of the environment is similar to the previous state(s) of the environment, then the authentication device(s) 108 may determine the duration by increasing a previous duration. Alternatively, if the transition(s) indicate that the current state of the environment is different than the previous state(s) of the environment, then the authentication device(s) 108 may determine the duration by decreasing the previous duration.

An operation 412 represents generating data representing at least the duration and an operation 414 represents sending the data. For instance, the authentication device(s) 108 may generate the data (e.g., a token, a cookie, etc.) that represents at least the duration. In some instances, the authentication device(s) 108 then send the data to the user device. Additionally, or alternatively, in some instances, the authentication device(s) 108 send the data to one or more service devices. In either of the instances, the user device uses the data to gain access to services provided by the service device(s). For instance, the service device(s) may use the data to determine that the user device includes a trusted device during the duration.

Figure 5:
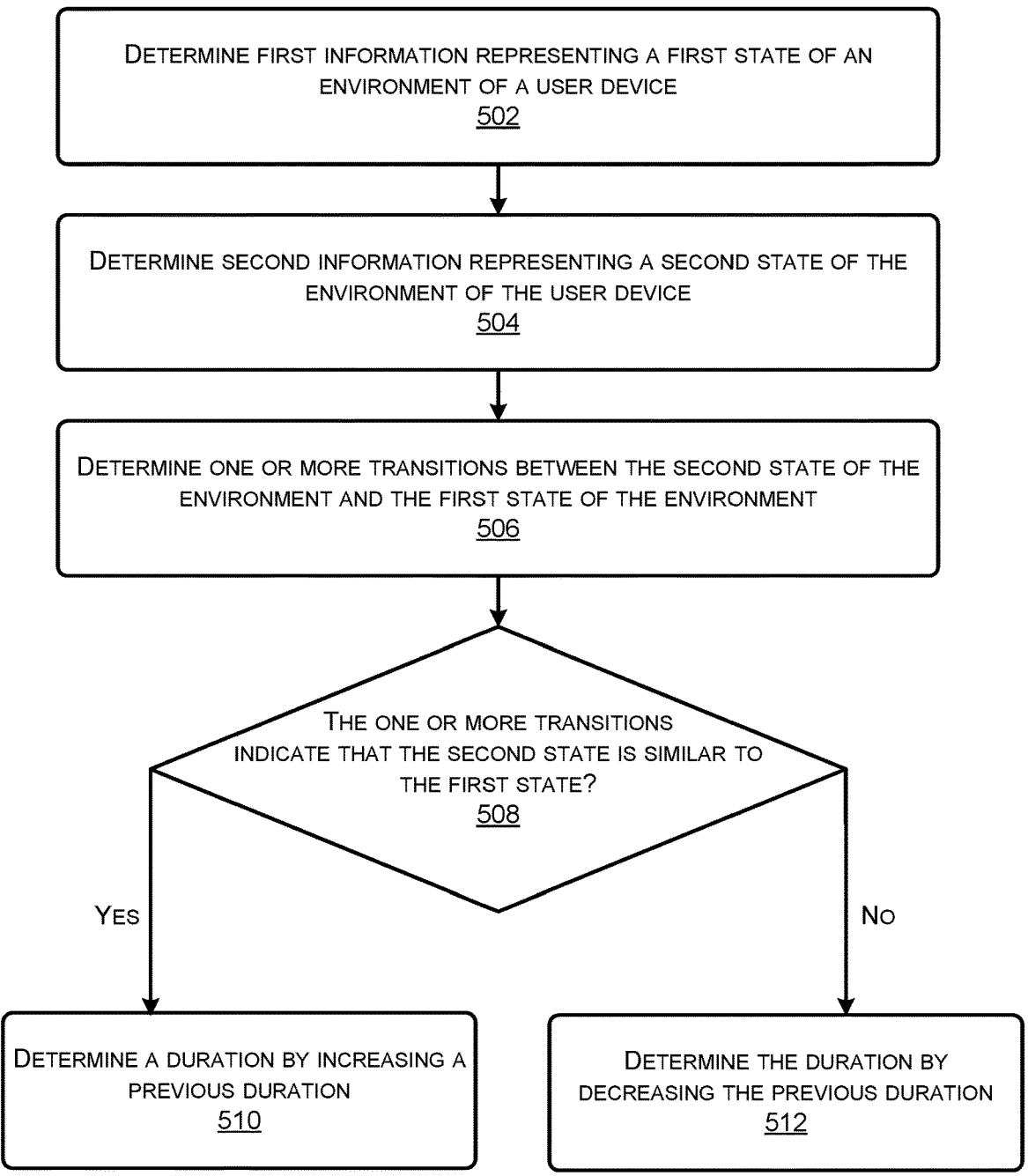
FIG. 5 illustrates a flow diagram of a third example method for determining a duration associated with authenticating a user device during a session.

FIG. 5 illustrates a flow diagram of a third example method 500 for determining a duration associated with authenticating a user device during a session. An operation 502 represents determining first information representing a first state of an environment of a user device. For instance, the authentication device(s) 108 may have previously authenticated the user device for the first session. Based at least in part on authenticating the user device, the authentication device(s) 108 may receive the first information representing the first state of the environment of the user device during the first session. The authentication device(s) 108 may have then used the first information to determine a first duration for the first session.

An operation 504 represents receiving second information representing a second state of the environment of the user device. For instance, the authentication device(s) 108 may be authenticating the user device for a second session. Based at least in part on authenticating the user device, the authentication device(s) 108 may receive the second information representing the second state of the environment of the user device during the second session.

An operation 506 represents determining one or more transitions between the second state of the environment and the first state of the environment. For instance, the authentication device(s) 108 may analyze the first information with respect to the second information in order to determine the transition(s). As described herein, the transition(s) may include, but are not limited to, a change in the unique device identifier, a change in the hardware associated with the user device, a change in the software installed on the user device, a change in the one or more applications that are active on the user device, a change in the CPU usage associated with the user device, a change in the memory usage associated with the user device, a change in the IP address associated with the user device, a change in the power consumption associated with the user device (e.g., whether the user device was continuously receiving power or whether the user device stopped receiving power for period(s) of time), a change in the type of network connection associated with the user device, or a change in the user of the user device (as determined using the sensor data).

An operation 508 represents determining whether the one or more transitions indicate that the second state is similar to the first state. For instance, the authentication device(s) 108 may analyze the transition(s) in order to determine whether the second state of the environment is similar to the first state of the environment. In some instances, the authentication device(s) 108 may determine that the second state is similar to the first state when the transition(s) represent small changes between the states, such as small changes in the CPU usage, memory usage, and/or the like. Additionally, in some instances, the authentication device(s) 108 may determine that the second state is not similar to the first state when the transition(s) represent large changes between the states, such as a change in the unique device identifier, a change in the IP address, a change in the user, and/or the like.

It, at 508, it is determined that the one or more transitions indicate that the second state is similar to the first state, then an operation 510 represents determining a duration by increasing a previous duration. For instance, if the authentication device(s) 108 determine that the second state is similar to the first state, then the authentication device(s) 108 may determine the duration by increasing the previous duration. In some instances, the authentication device(s) 108 may increase the previous duration by a greater amount the more similar the second state is to the first state.

However, if, at 508, it is determined that the one or more transitions indicate that the second state is not similar to the first state, then an operation 512 represents determining the duration by decreasing the previous duration. For instance, if the authentication device(s) 108 determine that the second state is not similar to the first state, then the authentication device(s) 108 may determine the duration by decreasing the previous duration. In some instances, the authentication device(s) 108 may decrease the previous duration by a greater amount the more dissimilar the second state is to the first state.

It should be noted that, while the example of FIG. 5 describe the authentication device(s) 108 as performing 502-506, in other examples, the user device may perform 502-506. In such instances, the authentication device(s) 108 may then receive, from the user device, information representing the transition(s).

Figure 6:
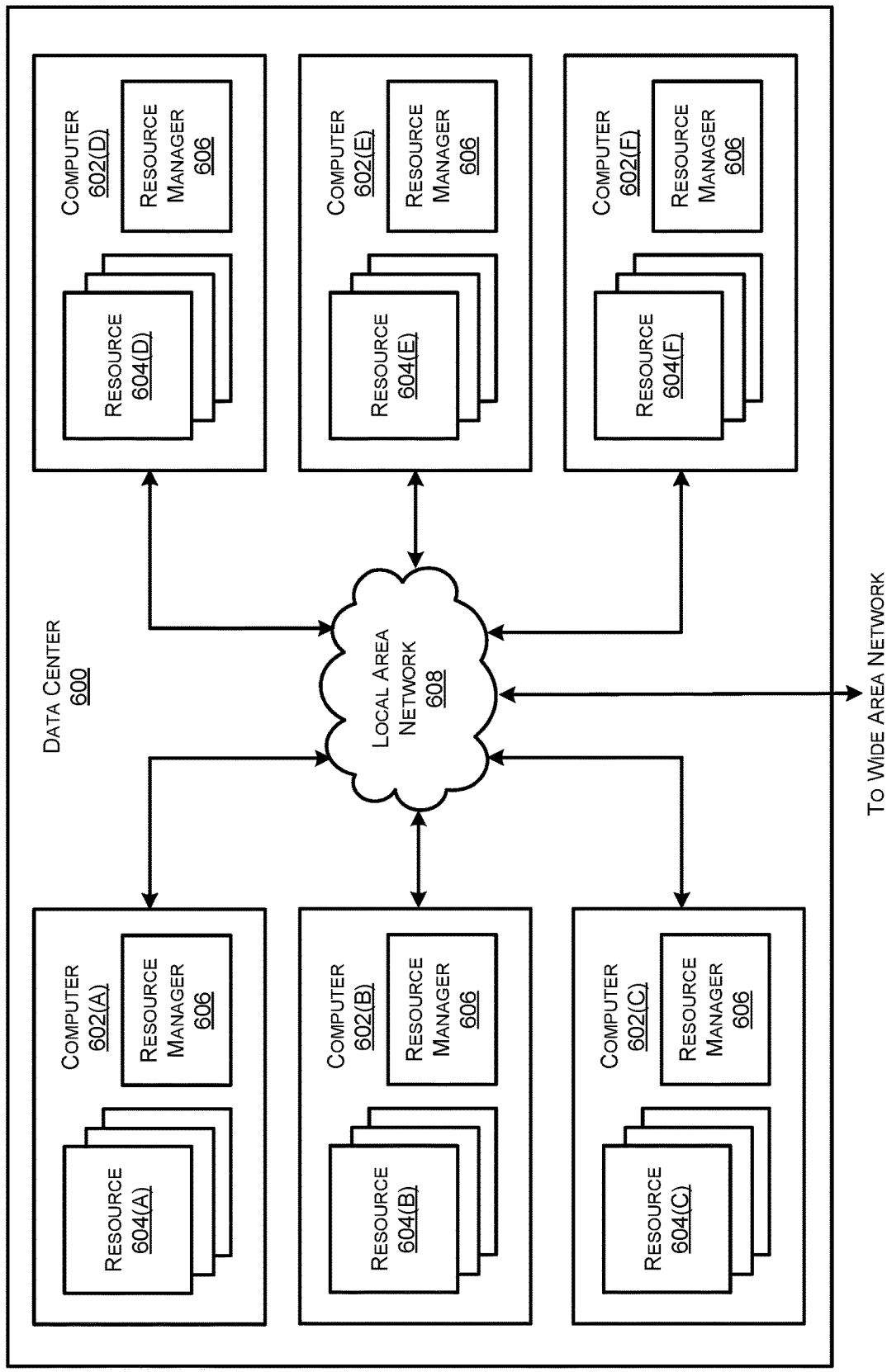
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as the server device(s) 106 and/or the authentication device(s) 108. Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in the cloud computing network 102.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
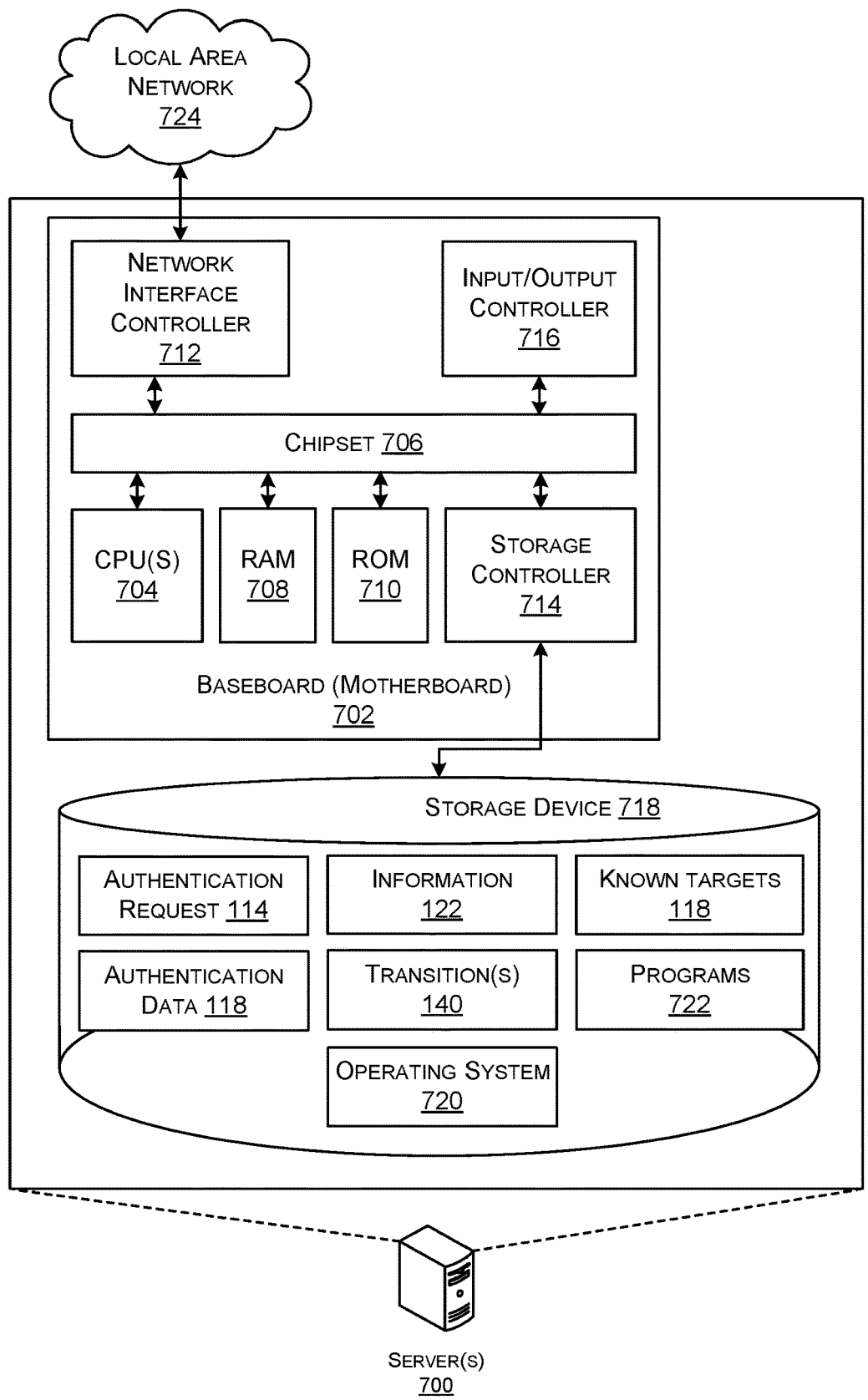
FIG. 7 is a computer architecture diagram showing an illustrative computer hardware architecture for implementing a server computing device that can be utilized to implement aspects of the various technologies presented herein.

FIG. 7 is a computer architecture diagram showing an illustrative computer hardware architecture for implementing a server computing device 700 that can be utilized to implement aspects of the various technologies presented herein. The server device(s) 106 and/or the authentication device(s) 108, discussed above, may include some or all of the components discussed below with reference to the server computing device 700.

To begin, the server computer 700 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 700 can also be configured to execute a resource manager capable of instantiating and/or managing the computing resources. In the case of VM instances, for example, the resource manager can be a hypervisor or another type of program configured to enable the execution of multiple VM instances on a single server computer 700. Server computers 700 in a data center can also be configured to provide network services and other types of services.

The server computer 700 includes a baseboard 702, or "motherboard," which is a printed circuit board to which a multitude of components or devices can be connected by way of a system bus or other electrical communication paths. In one illustrative configuration, one or more central processing units (CPUs) 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as a local area network 724. The chipset 706 can include functionality for providing network connectivity through a Network Interface Card (NIC) 712, such as a gigabit Ethernet adapter. The NIC 712 is capable of connecting the computer 700 to other computing devices over the network. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI (SAS) interface, a serial advanced technology attachment (SATA) interface, an FC interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the computer 700, and or any components included therein, may be supported by one or more devices similar to computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 3-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The server computer 700 may also store, in the storage device 718, the authentication request 114, the authentication data 118, the information 122, and the transition(s) 140, described above.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. One or more devices comprising:
one or more processors; and
one or more computer-readable media storing instructions that, when executed by the one or more processors, cause the one or more processors to perform operations comprising:
determining a first duration associated with authenticating a user device during a first session;
receiving credentials associated with a user account;
authenticating the user device for a second session based at least in part on the credentials;
receiving information associated with a transition in an environment of the user device between the first session and the second session;
determining, based at least in part on the information, a second duration by increasing or decreasing the first session, the second duration associated with authenticating the user device during the second session;
generating data representing at least the second duration; and
sending the data to the user device.

2. The one or more devices as recited in claim 1, the operations further comprising:
sending an authentication request associated with the second session;
receiving a response to the authentication request; and
verifying the response for the authentication request,
and wherein authenticating the user device for the second session is further based at least in part on verifying the response.

3. The one or more devices as recited in claim 1, the operations further comprising:
determining that the one or more transitions indicate that the second state of the environment is similar to the first state of the environment,
and wherein determining the second duration comprises determining the second duration by increasing the first duration based at least in part on the second state of the environment being similar to the first state of the environment.

4. The one or more devices as recited in claim 1, the operations further comprising:
 determining that the one or more transitions indicate that the second state of the environment is different than the first state of the environment,
 and wherein determining the second duration comprises determining the second duration by decreasing the first duration based at least in part on the second state of the environment being different than the first state of the environment.

5. The one or more devices as recited in claim 1, wherein the information is first information representing the second state of the environment, and wherein the operations further comprise:
 storing second information representing the first state of the environment,
 and wherein determining that the first information indicates the one or more transitions comprises analyzing the first information with respect to the second information to determine the one or more transitions associated with the first state of the environment during the first session and the second state of the environment during the second session.

6. The one or more devices as recited in claim 1, wherein the information is first information and the data is first data, and wherein the operations further comprise:
 receiving second information associated with the environment of the user device;
 determining the first duration based at least in part on a set duration and the second information;
 generating second data representing the first duration; and
 sending the second data to the user device.

7. The one or more devices as recited in claim 1, wherein the information is first information, and wherein the operations further comprise:
 during the second duration, receiving second information associated with the environment of the user device;
 determining that the second information indicates a triggering event; and
 determining to reauthenticate the user device based at least in part on the second information indicating the triggering event.

8. The one or more devices as recited in claim 1, wherein the information associated with the environment indicates at least one of:
 a unique device identifier associated with the user device;
 hardware associated with the user device;
 software installed on the user device;
 one or more applications that are active on the user device;
 central processing unit usage associated with the user device;
 memory usage associated with the user device;
 an Internet Protocol address;
 power consumption associated with the user device;
 a type of network connection associated with the user device; or
 sensor data representing a user of the user device.

9. A method comprising:
 storing first information associated with an environment of a user device during a first session;
 determining a first duration associated with authenticating the user device during the first session;
 receiving credentials associated with a user account;
 authenticating the user device for a second session based at least in part on the credentials;
 receiving second information associated with the environment of the user device for the second session;
 determining, based at least in part on the first information, the second information, and the first duration, a second duration associated with authenticating the user device during the second session;
 generating data representing at least the second duration; and
 sending the data to the user device.

10. The method as recited in claim 9, further comprising:
 sending an authentication request associated with the second session;
 receiving a response to the authentication request; and
 verifying the response for the authentication request,
 and wherein authenticating the user device for the second session is further based at least in part on verifying the response.

11. The method as recited in claim 9, further comprising:
 analyzing the first information with respect to the second information to determine one or more transitions associated with the environment between the first session and the second session,
 and wherein determining the second duration comprises increasing or decreasing the first duration based at least in part on the one or more transitions.

12. The method as recited in claim 11, further comprising:
 determining that the one or more transitions indicate that a second state of the environment during the second session is similar to a first state of the environment during the first session,
 and wherein determining the second duration comprises determining the second duration by increasing the first duration based at least in part on the second state of the environment being similar to the first state of the environment.

13. The method as recited in claim 11, further comprising:
 determining that the one or more transitions indicate that a second state of the environment during the second session is different than a first state of the environment during a first session,
 and wherein determining the second duration comprises determining the second duration by decreasing the first duration based at least in part on the second state of the environment being different than the first state of the environment.

14. The method as recited in claim 11, wherein the one or more transitions associated with the environment between the first session and the second session comprises at least one of:
 a change in a unique device identifier associated with the user device;
 a change in hardware associated with the user device;
 a change software installed on the user device;
 a change one or more applications that are active on the user device;
 a change central processing unit usage associated with the user device;
 a change memory usage associated with the user device;
 a change an Internet Protocol address;
 a change power consumption associated with the user device; or a change a type of network connection associated with the user device.

15. The method as recited in claim 9, further comprising:
during the second duration, receiving third information associated with the environment of the user device;
determining that the third information indicates a triggering event; and
determining to reauthenticate the user device based at least in part on the third information indicating the triggering event.

16. A method comprising:
determining a first duration associated with authenticating a user device during a first session;
receiving credentials associated with a user account;
authenticating the user device for a second session based at least in part on the credentials;
receiving information associated with an environment of the user device;
determining, based at least in part on the information, a second duration by increasing or decreasing the first duration, the second duration associated with authenticating the user device during the second session;
generating data representing at least the second duration;
sending the data; and
determining that the information indicates one or more transitions associated with the environment between the first session and the second session,
and wherein determining the second duration is based at least in part on the one or more transitions.

17. The method as recited in claim 16, further comprising:
sending an authentication request associated with the second session;
receiving a response to the authentication request; and
verifying the response for the authentication request,
and wherein authenticating the user device for the second session is further based at least in part on verifying the response.

18. The method as recited in claim 16, wherein the information is first information and the data is first data, and wherein the operations further comprise:
receiving second information associated with the environment of the user device;
determining the first duration based at least in part on a set duration and the second information;
generating second data representing the first duration; and
sending the second data to the user device.

* * * * *